W. M. COWARD.
DISTRIBUTING AND REVERSING EXPANSION VALVE.
APPLICATION FILED AUG. 6, 1908.

957,499.

Patented May 10, 1910.

Witnesses
L. F. Rock
A. M. Bunn

Inventor
William M. Coward
per
Chas. H. Becker
Attorney

W. M. COWARD.
DISTRIBUTING AND REVERSING EXPANSION VALVE.
APPLICATION FILED AUG. 6, 1908.

957,499.

Patented May 10, 1910.

Witnesses
L. F. Rock.
A. M. Brown

Inventor
William M. Coward
per
Chas. H. Richer
Attorney

Fig. 9.

W. M. COWARD.
DISTRIBUTING AND REVERSING EXPANSION VALVE.
APPLICATION FILED AUG. 6, 1908.

957,499.

Patented May 10, 1910.
9 SHEETS—SHEET 5.

Witnesses
L. F. Birch.
A. M. Burn

Inventor
William M. Coward.
per
Chas. H. Richer
Attorney

W. M. COWARD.
DISTRIBUTING AND REVERSING EXPANSION VALVE.
APPLICATION FILED AUG. 6, 1908.

957,499.

Patented May 10, 1910.

Witnesses

Inventor
William M. Coward
per
Chas. H. Richer
Attorney

UNITED STATES PATENT OFFICE.

WILLIAM MONTAGU COWARD, OF SYDNEY, NEW SOUTH WALES, AUSTRALIA.

DISTRIBUTING AND REVERSING EXPANSION-VALVE.

957,499. Specification of Letters Patent. Patented May 10, 1910.

Application filed August 6, 1908. Serial No. 447,292.

*To all whom it may concern:*

Be it known that I, WILLIAM MONTAGU COWARD, a subject of the King of Great Britain and Ireland, residing at 19 Hunter street, Sydney, in the State of New South Wales, in the Commonwealth of Australia, have invented certain new and useful Improvements in Distributing and Reversing Expansion-Valves, of which the following is a specification.

This invention relates to improvements in rotary distributing valves for steam and other fluid pressure engines, and has for its object generally to produce a valve in which the operating parts and friction of same are reduced to a minimum; and further a valve in which the cut-off can be easily regulated, either by hand or by gearing to a governor without affecting the three other critical positions of the valve; also to stop the engine independently of the throttle valve, reverse its running or vary the "lead," further to increase the rapidity of action, of a distributing valve allowing the ports to become fully open even at an early cut-off. Also to provide a valve which will serve one or more cylinders.

The object of my invention particularly is to provide a distributing valve of this character comprising a cylindrical or taper valve surrounded by a slotted reversing sleeve or casing, a regulating cut-off sleeve, a valve chamber, and a valve operating rod, thus simplifying the construction of the valve, reducing the friction and doing away with the eccentrics and all the gear at present necessary for operating and controlling a slide, piston, or rocking valve, and otherwise carrying out the general objects of the invention. But in order that my invention may be clearly understood I shall now refer to the accompanying drawings in which:—

Figure 1:
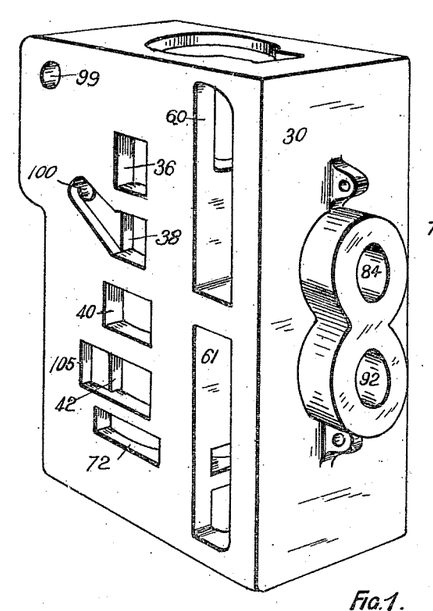
Figure 1 is a perspective view of the valve chamber, with valve and its appurtenances removed.
Figure 2:
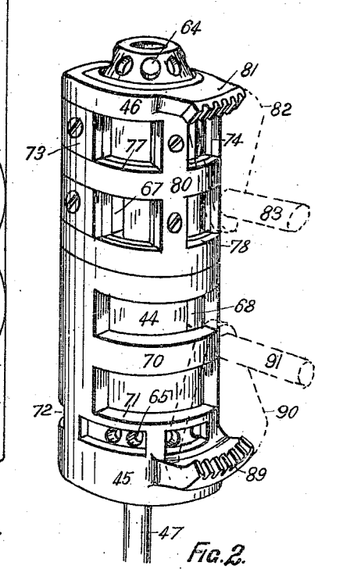
Fig. 2 is a perspective view of the valve and its appurtenances removed from the valve chamber.
Figure 3:
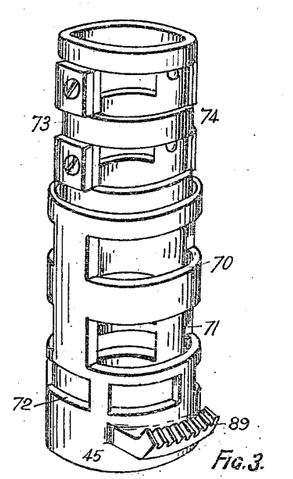
Fig. 3 a similar view of the valve sleeve seating.
Figure 4:
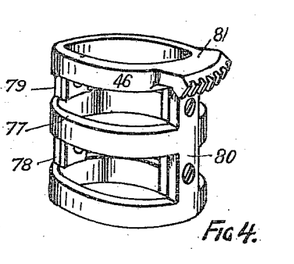
Fig. 4 a similar view of the cut-off sleeve.
Figure 5:
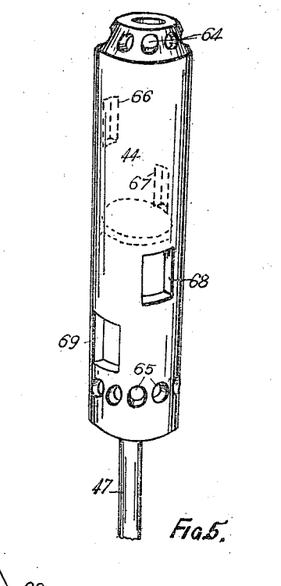
Fig. 5 a similar view of the valve.
Figure 6:
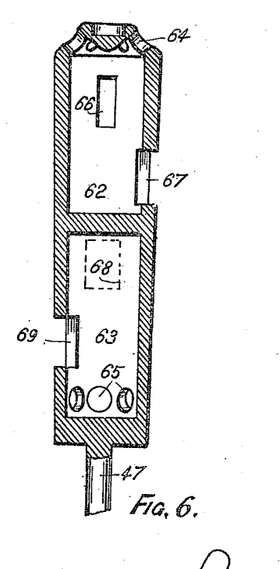
Fig. 6 a longitudinal section through the valve.

Referring to Figs. 1 to 18, the valve chamber 30 is secured between the two cylinders 31 and 32 by studs 33 and has a supply pipe 34 and exhaust pipe 35 and live-steam ports 36, 37, 38 and 39, also exhaust ports 40, 41, 42 and 43 in connection with the various ends of the cylinders. Within the valve chamber 30 is a slightly tapered valve 44 surrounded by a slotted sleeve 45 (hereinafter termed "reversing sleeve") and having the regulating cut-off sleeve 46 (hereinafter termed the "cut-off sleeve"). The bottom end of the valve rests upon balls 54 in a raceway 55 having an adjustable thrust bush or bearing 56 in the bottom end cover 57 of the valve chamber, while its upper end has bearing in the adjustable set screw 58 contained in the top cover 59. The valve chamber is divided into two compartments 60 and 61, the former for steam and the latter for exhaust. The valve is also divided into similar compartments 62 and 63 and has steam inlet orifices 64 in the former division and exhaust orifices 65 in the latter division. The compartment 62 has two live-steam ports 66 and 67, the former being in advance of the latter in accordance to the advanced lead of one crank to the other. The exhaust compartment has ports 68 and 69 in advance of the other similar to the live-steam ports, but diametrically opposite to their corresponding live-steam ports. The portion of the reversing sleeve 45 that surrounds the exhaust compartment 63 has exhaust passages 70 and 71 and final exhaust ports 72, while the other half has two narrow longitudinal strips 73 and 74 forming division pieces and creating two compartments 75 and 76 in the valve chamber, see Figs. 7 and 8. These strips form a bearing for the cut-off sleeve 46 which is a slotted sleeve having steam passages 77 and 78 and strips 79 and 80 for the purpose of regulating the cut-off, see Figs. 4, 7 and 8. This cut-off sleeve 46 has a toothed sector 81, the center of which corresponds with the center of the strips described, gearing with toothed sector 82 in the valve chamber and pinned to the spindle 83 passing through stuffing box 84 and having an operating handle 85 engaging with notching sector 86 hinged to the valve chamber and has a handle 87 and spring 88, see Fig. 9. The reversing sleeve 45 has also a toothed sector 89 gearing with a toothed sector 90 within the valve chamber and pinned to a spindle 91 passing through stuffing box 92 and an operating handle 93 engaging with a notching sector 94 hinged to the valve chamber having a handle 95 and normal spring 96.

In operation the steam enters from the supply pipe 34 (Fig. 9) into the steam chest or division 60, thence through orifices 64 into the live-steam port 66, through aperture 77, port 36 into passage 97 to the lower end of cylinder 31; or through port 37 into passage 99 to the top end of cylinder 31. Again steam passes through port 67, aperture 78, port 38 along passage 100 to the top of cylinder 32 or through port 39 along passage 102 into the bottom of cylinder 32. The exhaust from the top end of cylinder 31 enters passage 99 along passage 103, through port 41, aperture 70, and port 68 into the exhaust chamber 63 through orifices 65 and 72 to exhaust compartment 61 thence into exhaust pipe 35. The exhaust from the bottom of cylinder 31 enters passages 97 and 104, through port 40 into exhaust chamber 63 thence to exhaust pipe 35. The exhaust from top end of cylinder 32 enters passages 100 and 105, passes through port 42 into exhaust chamber 63 thence to exhaust pipe 35. The exhaust from the lower end of cylinder 32 enters passage 102 into passage 106 into port 43 into exhaust chamber 63 thence to exhaust pipe 35. The steam and exhaust passages hereinbefore described can be clearly followed by referring to Fig. 10. The reversing of the engine is accomplished by moving the handle 93 after releasing it from the notching sector (see Figs. 7, 8 and 9).

Figure 9:
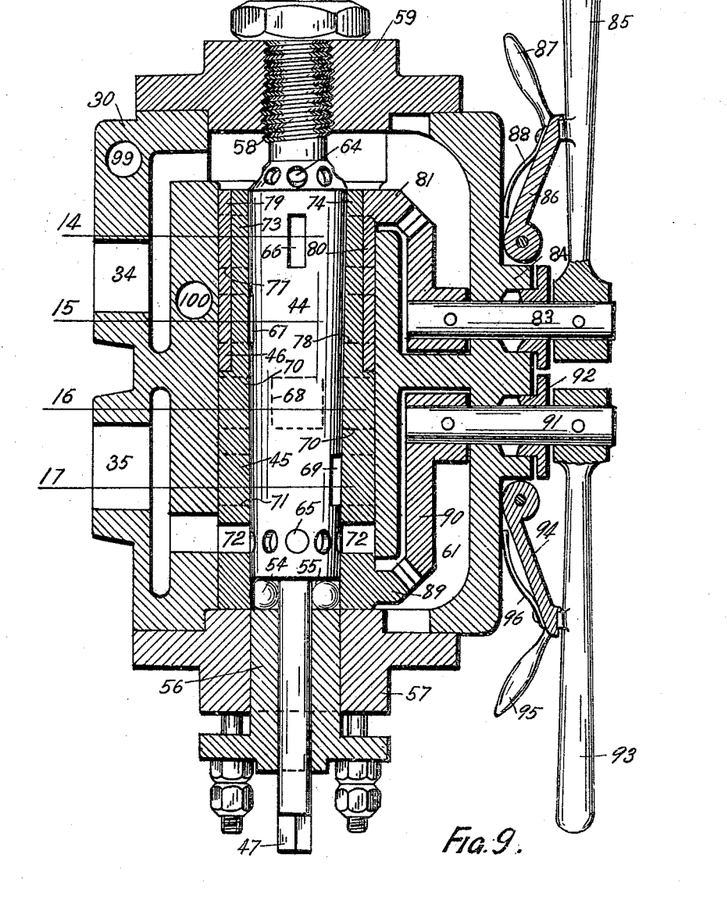
Fig. 9 a sectional elevation through valve chamber.
Figure 10:
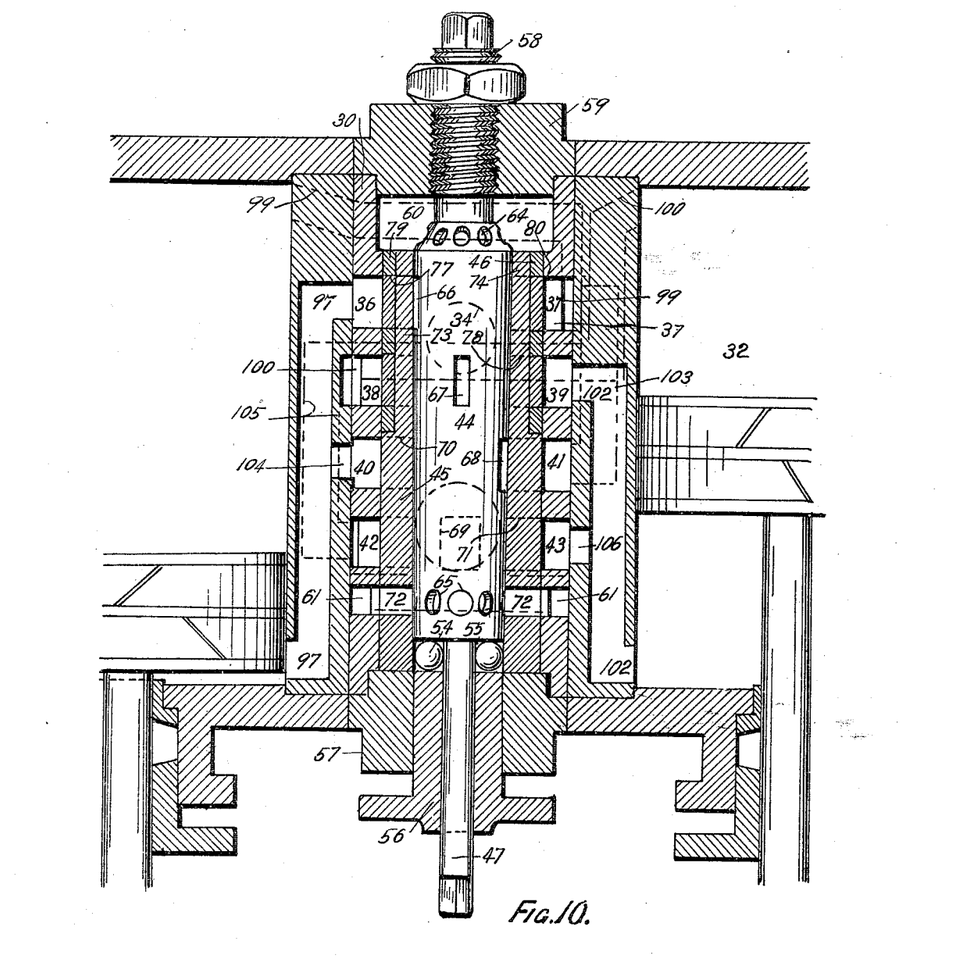
Fig. 10 a similar view through valve chamber and the two cylinders.
Figure 11:
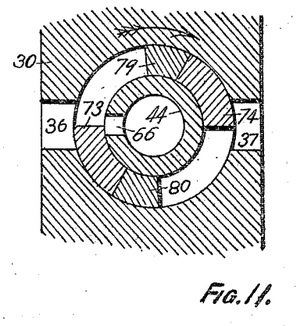
Figs. 11 to 14 are sectional diagrammatic views through the steam and exhaust ports when valve is running clock-wise.
Figure 12:
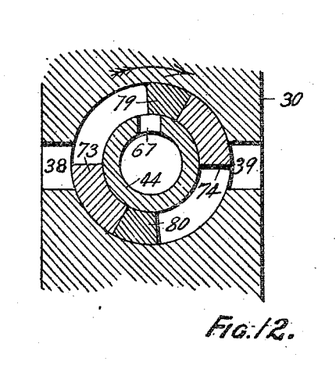
Figure 13:
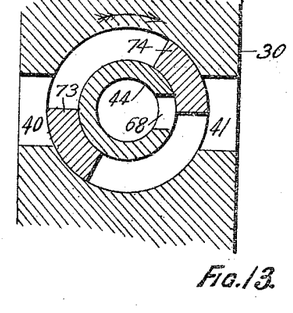
Figure 14:
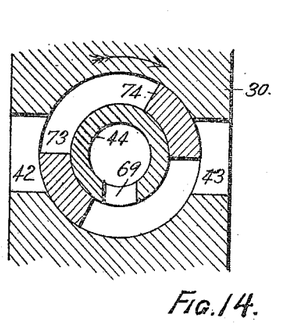
Figure 15:
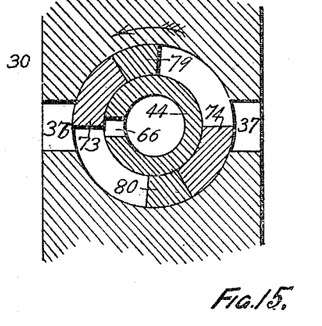
Figs. 15 to 18 are similar views when the valve is running anti-clockwise.
Figure 16:
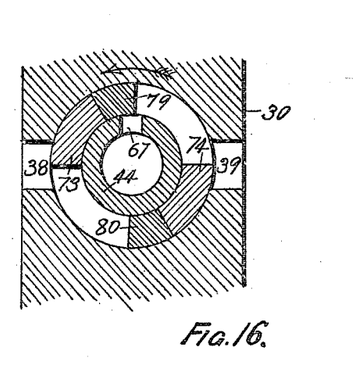
Figure 17:
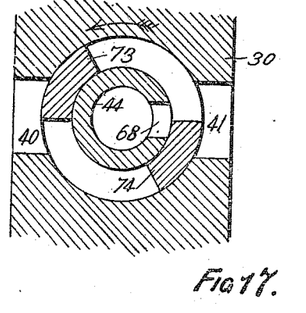
Figure 18:
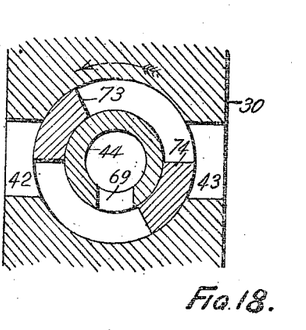

Referring to Figs. 11 to 14 these diagrammatic views are cross sections through the valve and valve chamber respectively on line 14, 15, 16 and 17 of Fig. 9, showing the position of the reversing sleeve and ports when the valve is running clockwise and also the relative positions of the steam ports and exhaust ports, that is to say, that the position of the steam port in Fig. 11 is relative to the exhaust port in Fig. 13 and similarly the steam port in Fig. 12 to the exhaust port in Fig. 17. In Figs. 15 to 18 the diagrammatic views show the position of the reversing sleeve and ports when the valve is running anti-clockwise.

Figure 7:
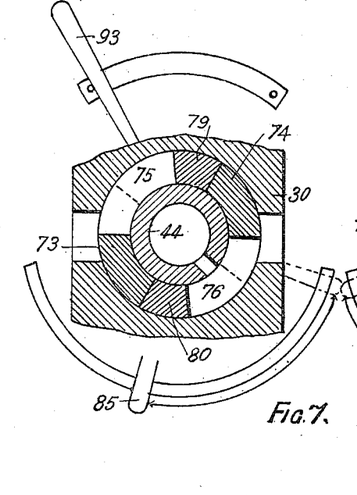
Figs. 7 and 8 are cross sections through the valve and valve-chamber showing the positions of the reversing sleeve when the engine is running clock-wise and anti-clockwise respectively.
Figure 8:
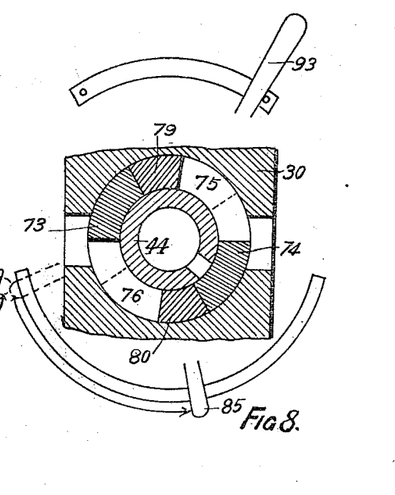

In regulating the cut-off, see Figs. 7 and 8, the handle 85 is operated and the strips 79 and 80 are made to increase or decrease the areas of the chambers 75 and 76 which are in connection with the steam ports of the valve chamber, thereby cutting off the supply of steam to said ports in the valve, at any desired position of the stroke within the range of the strips.

Figure 19:
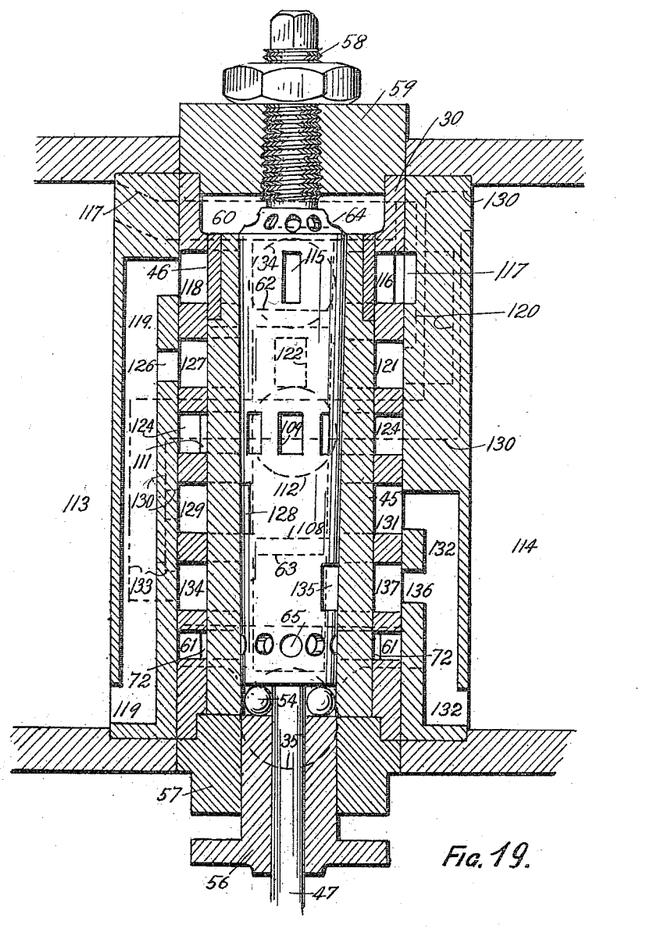
Fig. 19 a sectional elevation through valve chamber and cylinders of a compound engine with a regulating cut-off.

Referring to Fig. 19 which shows the valve applied to a compound engine. In this case the valve chamber, reversing sleeve, and cut-off sleeve are of similar construction to that hereinbefore described, with the exception that the valve is divided into three compartments, viz., steam 62, receiver 108, and exhaust 63. The receiver compartment 108 has ports 109 leading into passages 111 to the pipe 112 to the receiver chamber. The cylinder 113 is the high-pressure and cylinder 114 the low-pressure. In action the steam enters compartment 60 through orifices 64 into chamber 62, through port 115, port 116 along passage 117 into the top end of cylinder 113; or through port 118 along passage 119 to the lower end of the cylinder 113. The exhaust from the top of cylinder 113 enters passages 117 and 120 through ports 121, and 122 into receiver chamber 108, and through ports 109 and 111, into annulus 124 to entrance 112 of the receiver. The exhaust from the bottom of the high-pressure cylinder 113 enters passage 119 passes through port 127 into port 122 to receiver chamber 108. The low-pressure cylinder 114 receives steam from chamber 108 through ports 128 and 131 into passage 130 leading to the top end of cylinder; or through port 129 and passage 132 to the bottom end of cylinder 114. The exhaust from the top low-pressure cylinder 114 enters passage 130 into passage 136, through port 135 of the valve into chamber 63 thence to condenser pipe 35. The exhaust from the bottom of cylinder 114 enters passage 132, ports 134 and 135 into chamber 63 thence to condenser pipe 35. The method of reversing and regulating the cut-off stroke is similar to that hereinbefore described.

Figure 20:
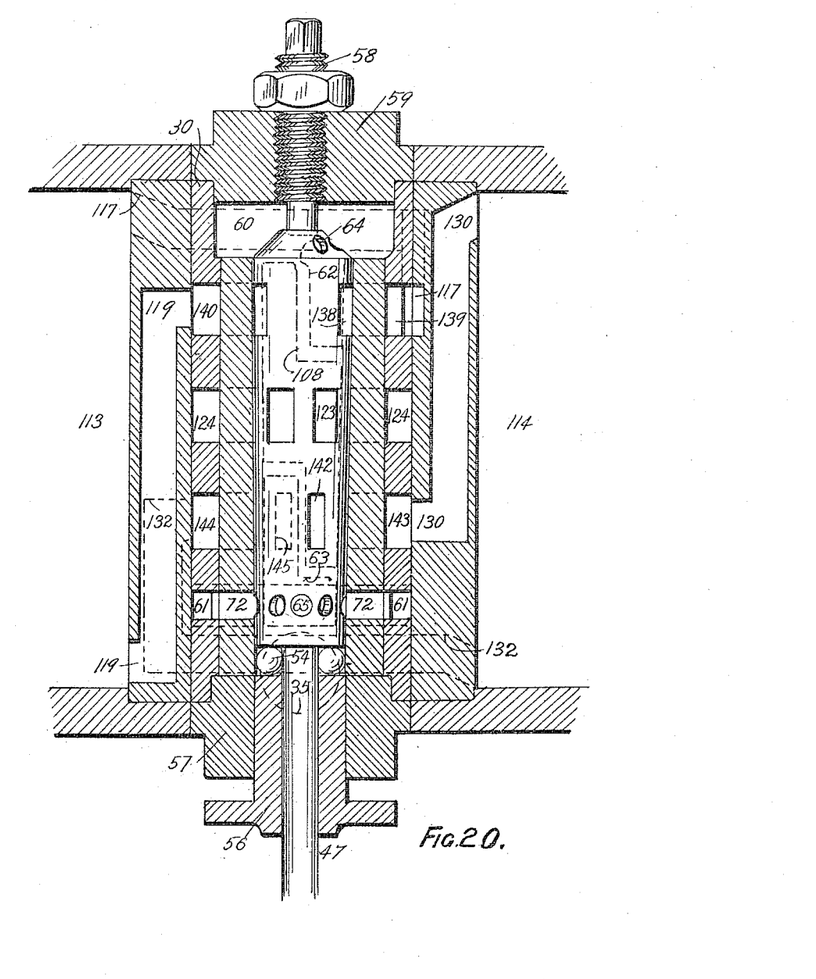
Fig. 20 a similar view showing the valve having a fixed cut-off.
Figure 21:
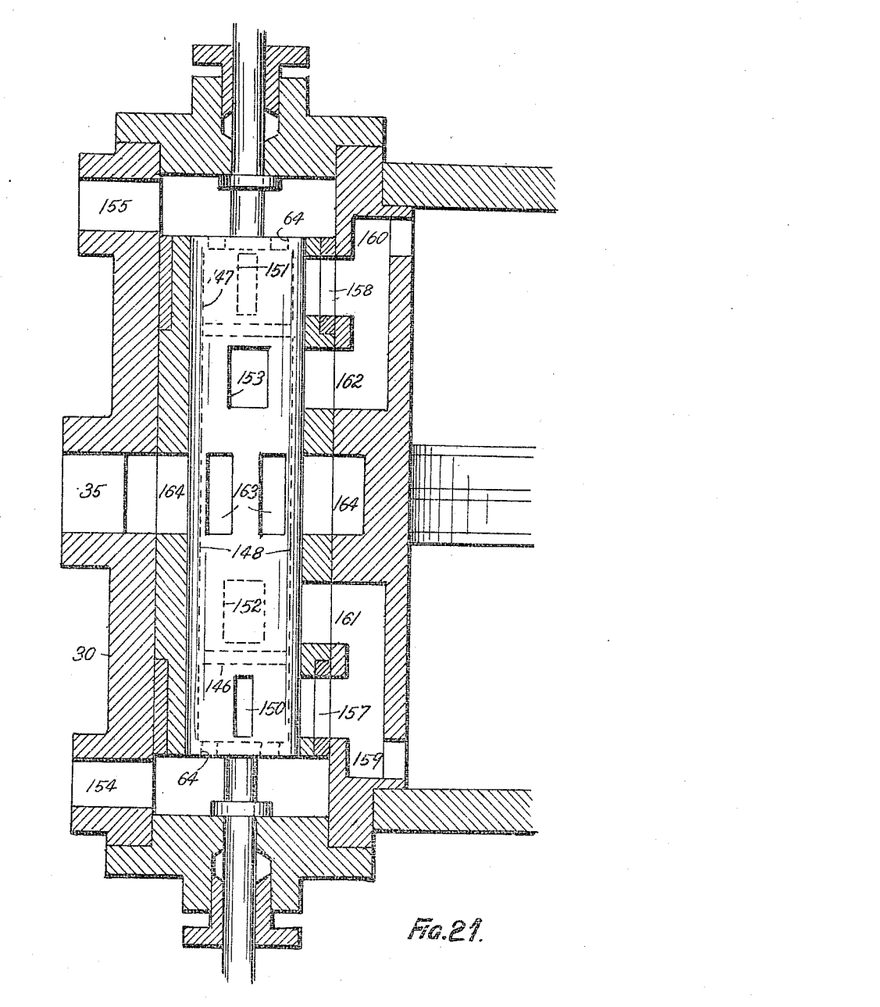
Fig. 21 a similar view showing a balanced valve with variable cut-off as applied to a single expansion cylinder.

Referring to Fig. 20 which shows a similar valve to that shown in Fig. 21 but with the variable cut-off dispensed with. This construction of valve enables the steam and exhaust ports to work in one plane but diametrically opposite one another.

In operation the steam enters compartment 60 through orifices 64 into steam chamber 62 out by ports 138 and 139 along passage 117 to the top end of high-pressure cylinder 113; or through ports 138 and 140 along passage 119 to the bottom end of cylinder 113. The exhaust from the top end of cylinder 113 enters passage 117, then ports 139 and 141 passing into receiver chamber 108. The exhaust from the bottom end enters passage 119, then ports 140 and 141 into receiver chamber 108. The steam in receiver chamber 108 passes through ports 123 into annulus 124 leading to a receiver. This steam supplies the low-pressure cylinder 114 by passing through ports 142 and 143 along passage 130 to the top end of cylinder, or through ports 142 and 144 along passage 132 to the lower end of the cylinder. The exhaust from the top end of cylinder 114 enters passage 130, then ports 143 and 145 into exhaust chamber 63, through orifices 65 into passages 72 leading to condenser pipe 35. The exhaust from the lower end of cylinder 114 enters passage 132, then ports 144 and 145 into exhaust chamber 63 thence to condenser pipe 35.

The reversing of the engine is similar to that hereinbefore described. The valve may be applied to an engine having any number of expansion cylinders by being correspondingly lengthened or made in two lengths and divided off into a number of chambers corresponding to the number of cylinders.

Referring to Fig. 21 which shows a cylindrical balanced valve applied to a single expansion cylinder engine. In this case in order to balance the valve, steam is admitted at both ends through supply pipes 154 and 155, or a passage formed in the valve chamber 30. The steam ports 150 and 151 are diametrically opposite to one another as are also their corresponding exhaust ports 152 and 153. The valve is divided into three chambers 146, 147 and 148, the two former being for steam and the latter for exhaust. The steam enters by the supply pipes 154 and 155 at each end of the valve chamber 30 passes through orifices 64 into the end steam chambers 146 and 147 through valve ports 150 and 151, then the outer ports 157 and 158 along passages 159 and 160 to the cylinder. The exhaust enters the passages 159 and 160 then ports 161 and 162, valve ports 152 and 153 into exhaust chamber 148, thence through ports 163 into the annular passage 164 to exhaust pipe 35. In this case there are two cut-off sleeves, one at each end of the valve. These are suitably connected together and may be geared to engine governor to obtain an automatic cut-off. Reversing is similarly obtained as hereinbefore described.

What I claim and desire to secure by Letters Patent is:—

A distributing and reversing expansion valve comprising a valve chamber having a plurality of live steam ports and a plurality of exhaust ports, a tapered valve within the valve chamber, a slotted reversing sleeve surrounding the tapered valve, a cut off sleeve, a toothed sector for the cut off sleeve, a spindle provided with an operating handle, a toothed sector mounted upon the spindle meshing with the toothed sector of the cut off sleeve, a toothed sector for the reversing sleeve, a spindle, a pivoted sector within the valve chamber pinned to the spindle meshing with the toothed sector of the reversing sleeve.

Signed at Sydney, New South Wales this 6th day of July 1908.

WILLIAM MONTAGU COWARD.

Witnesses:
 WALTER SIGMONT,
 WILLIAM NEWTON.